US011252972B2

(12) United States Patent
Sabatel et al.

(10) Patent No.: US 11,252,972 B2
(45) Date of Patent: Feb. 22, 2022

(54) METHOD OF DRYING VEGETABLES

(71) Applicant: Wild Pilot Food, S.L., Viator (ES)

(72) Inventors: Saioa Alvarez Sabatel, Sukarrieta (ES); Raquel Rodríguez Fernández, Sukarrieta (ES); Izaskun Pérez Simón, Sukarrieta (ES); Iñigo Martínez De Marañón Ibabe, Sukarrieta (ES)

(73) Assignee: Wild Pilot Food, S.L., Almeria (ES)

( * ) Notice: Subject to any disclaimer, the term of this patent is extended or adjusted under 35 U.S.C. 154(b) by 94 days.

(21) Appl. No.: 16/482,103

(22) PCT Filed: Jan. 31, 2017

(86) PCT No.: PCT/ES2017/070052
§ 371 (c)(1),
(2) Date: Jul. 30, 2019

(87) PCT Pub. No.: WO2018/141997
PCT Pub. Date: Aug. 9, 2018

(65) Prior Publication Data
US 2020/0236957 A1    Jul. 30, 2020

(51) Int. Cl.
| *A23B 7/01* | (2006.01) |
| *A23B 7/02* | (2006.01) |
| *A23L 3/015* | (2006.01) |
| *A23L 19/00* | (2016.01) |
| *A23L 3/01* | (2006.01) |

(Continued)

(52) U.S. Cl.
CPC .................. *A23B 7/01* (2013.01); *A23B 7/02* (2013.01); *A23B 7/021* (2013.01); *A23B 7/0215* (2013.01); *A23L 3/01* (2013.01); *A23L 3/0155* (2013.01); *A23L 3/52* (2013.01); *A23L 5/34* (2016.08); *A23L 19/03* (2016.08); *A23V 2002/00* (2013.01)

(58) Field of Classification Search
CPC ........... A23B 7/01; A23B 7/005–7/012; A23B 7/02–7/03; A23B 7/021; A23L 3/0155; A23L 3/54; A23L 3/01; A23L 19/03; A23L 5/15; A23L 5/34; A23L 3/52; A23V 2002/00; A23V 2300/10; A23V 2300/12; H05B 2206/046; H05B 6/80; F26B 3/28; F26B 3/347
USPC .......................................................... 426/422
See application file for complete search history.

(56) References Cited

U.S. PATENT DOCUMENTS 4,341,803 A * 7/1982 Koshida .................... A23B 7/01
                                                                34/284
4,418,083 A * 11/1983 McKinney ............. A23B 7/148
                                                                34/417

(Continued)

FOREIGN PATENT DOCUMENTS

| CN | 106259856 A | 1/2017 |
| KR | 20160079244 A | 7/2016 |

(Continued)

*Primary Examiner* — Drew E Becker
(74) *Attorney, Agent, or Firm* — Haukaas Fortius PLLC; Michael H. Haukaas

(57) ABSTRACT

The present invention relates to the field of food dehydration and production of snacks. In particular, the invention relates to a method for drying vegetables using microwaves in order to produce an improved dried product. The invention also relates to said dried vegetables and to the use thereof in the agro-food industry.

20 Claims, 7 Drawing Sheets

(51) Int. Cl.
*A23L 5/30* (2016.01)
*A23L 3/52* (2006.01)

(56) References Cited

U.S. PATENT DOCUMENTS

| | | | | |
|---|---|---|---|---|
| 4,640,020 | A * | 2/1987 | Wear | F26B 5/041 219/701 |
| 4,859,487 | A * | 8/1989 | Matsumura | A23B 7/08 426/639 |
| 5,020,237 | A * | 6/1991 | Gross | A23L 3/0055 219/685 |
| 5,676,989 | A * | 10/1997 | Durance | A23P 30/32 426/242 |
| 5,962,057 | A * | 10/1999 | Durance | A23B 7/01 219/701 |
| 6,086,933 | A * | 7/2000 | Rockstrom | A23B 7/0205 426/243 |
| 6,312,745 | B1 * | 11/2001 | Durance | A23B 7/02 219/686 |
| 9,155,133 | B2 * | 10/2015 | Wefers | H05B 6/80 |
| 2006/0034980 | A1 * | 2/2006 | Perdue | A23B 7/012 426/234 |
| 2008/0181994 | A1 * | 7/2008 | Cornwell | H05B 6/6426 426/242 |
| 2010/0159082 | A1 * | 6/2010 | Rupasinghe | A23B 7/085 426/102 |
| 2011/0045150 | A1 * | 2/2011 | Schlager Riebl | A23P 20/18 426/242 |
| 2015/0313273 | A1 * | 11/2015 | Stromotich | A23B 9/04 34/259 |
| 2015/0366249 | A1 * | 12/2015 | Lock | A23L 19/09 426/242 |
| 2016/0157501 | A1 * | 6/2016 | Monckeberg | A23B 7/024 426/242 |
| 2017/0265508 | A1 * | 9/2017 | Roy | A23L 5/30 |
| 2018/0160708 | A1 * | 6/2018 | Eisner | A23L 19/09 |
| 2019/0343136 | A1 * | 11/2019 | Durance | A23B 7/02 |
| 2020/0200475 | A1 * | 6/2020 | Durance | A23C 1/08 |
| 2021/0212347 | A1 * | 7/2021 | Zhang | A23L 3/44 |

FOREIGN PATENT DOCUMENTS

| | | |
|---|---|---|
| WO | 2012051670 A1 | 4/2012 |
| WO | 2015008153 A2 | 1/2015 |

* cited by examiner

METHOD OF DRYING VEGETABLES

RELATED APPLICATIONS

This application is a national stage application, filed under 35 U.S.C. § 371, of International Application No. PCT/ES2017/070052, filed Jan. 31, 2017, which is incorporated herein by reference.

FIELD OF THE INVENTION

The present invention relates to the field of food dehydration and production of snacks. Specifically, the invention relates to a method for drying vegetables by means of microwaves and vacuum drying in order to produce a dried product with specific sensory characteristics. The invention also relates to said dried vegetables and to the use thereof in the food industry.

BACKGROUND OF THE INVENTION

Fresh produce, in particular fruits and vegetables, normally have a moisture level in a range of 75% to 95% by weight (wet basis). One way of extending the shelf life of fresh food is by drying the same. A large number of methods for drying vegetables can be found in the state of the art. Depending of the moisture of the final product, dehydrated vegetables can be considered snack products. Royal Decree 126/1989, by which the Technical Health Regulation for the production and marketing of potato chips and snack products is approved, establishes that in order to belong to the category of snack products, the moisture content of the products must not exceed the maximum value of 5% (wet basis). In the case of potato chip snacks, the maximum moisture limit is established at 3%.

Dried vegetables that are obtained by conventional methods, for example by means of dryers that blow air at moderate temperatures (between 40° C. and 60° C.), have a moisture content greater than 5%, and thus do not belong to the category of snack products, and moreover they have chewy textures. If they are dried at higher temperatures, they can reach a moisture content of approximately 3-5%, but they acquire a shrinkage and compact structure.

Different methods for producing dried fruit snacks are known. Document U.S. Pat. No. 4,341,803 discloses a method for producing dry fruit chips in which the starting fruit chips are treated with a sugar solution (infused) to adjust the water-soluble sugar concentration thereof to a range of 6-25% and in which they are freeze-dried to reduce the moisture thereof to a predetermined level (between 15 and 60%). They are then dried by microwave vacuum drying to a second predetermined moisture level (between 10 and 40%). Lastly, they are vacuum dried until the moisture content is below 5%. As recognised by the inventors of U.S. Pat. No. 4,341,803, the dry fruit chips obtained by this method have a moderate hardness and a pleasant texture for the direct consumption thereof as a snack. However, to obtain said characteristics, it is necessary to add sugars during the infusion stage, which results in a snack with a less healthy nutritional profile due to the added sugars. U.S. Pat. No. 4,341,803 emphasises that each and every one of the aforementioned steps are essential to produce the dry fruit chip. In fact, it shows that if the drying is only done by microwave vacuum drying, without prior freeze-drying, the product obtained will lose flavour, have less volume and be burned. Likewise, if the sugar concentration in the prior infusion stage is less than 6% by weight, even if the three drying steps (freeze-drying, microwave vacuum drying, and vacuum drying) are correctly carried out, the resulting dehydrated fruit will not have the proper hardness to be consumed as a snack.

One characteristic that makes snacks especially attractive is the crunchiness thereof. However, this characteristic is not always obtainable by the processes described in the state of the art. As such, there is a need to develop a method for drying vegetables to moisture levels that allow them to be categorised as snacks and which, furthermore, produces a crunchy product. Surprisingly, the authors of the present invention have developed a simple and quick method for drying vegetables which results in a healthy snack and which, furthermore, has improved characteristics with regard to texture, such as the crunchiness thereof, and in the method thereof it is not necessary to add additional ingredients to the starting vegetable, such as for example sugars, or to fry the product.

OBJECT OF THE INVENTION

The present invention, in a first aspect thereof, relates to a method for drying vegetables, comprising the following steps:

a) applying microwave energy in conditions of absolute pressure between 123 mbar and atmospheric pressure to a starting vegetable until said vegetable reaches a temperature in a range of 50° C. to 70° C., wherein the starting vegetable has a moisture content that is less than 15%;

b) applying microwave energy at a microwave power density that is greater or equal to 1 W/g to the vegetable obtained in step a), at an absolute pressure less than or equal to 312 mbar, until the vegetable reaches a temperature in a range of 65° C. to 85° C.;

c) applying microwave energy in conditions of absolute pressure less than or equal to 312 mbar to the vegetable obtained in step b) until the vegetable reaches a temperature in a range of 70° C. to 100° C.; and d) cooling the vegetable obtained in step c) under vacuum, without applying microwaves, at an absolute pressure less than or equal to 123 mbar until reaching a temperature that is less than or equal to 50° C., wherein the temperature reached by the vegetable is greater in step b) than in step a), and is greater in step c) than in step b).

A second aspect of the present invention relates to a vegetable obtained by the method according to the first aspect of the present invention.

A third aspect of the present invention relates to a vegetable characterised in that it has a moisture content less than 3% and is crunchy.

A fourth aspect of the present invention relates to the use of a vegetable according to a second or third aspect of the invention for direct consumption or as an ingredient in the agro-food industry.

Other objects, characteristics, advantages and aspects of the present application will be evident for a person skilled in the art from the description and attached claims.

DETAILED DESCRIPTION OF THE INVENTION

Figure 1:
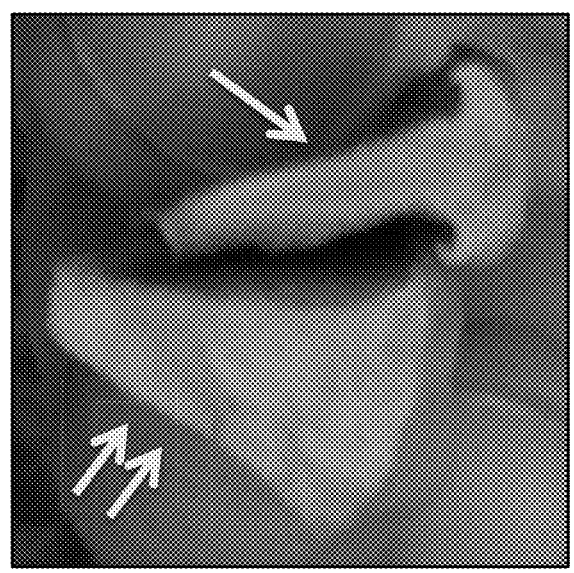
FIG. 1: Photograph of the starting product of the method of the present invention (partially dehydrated apple wedge, indicated by an arrow) and the final product after carrying out the method of the invention (indicated by two arrows).
Figure 2A:
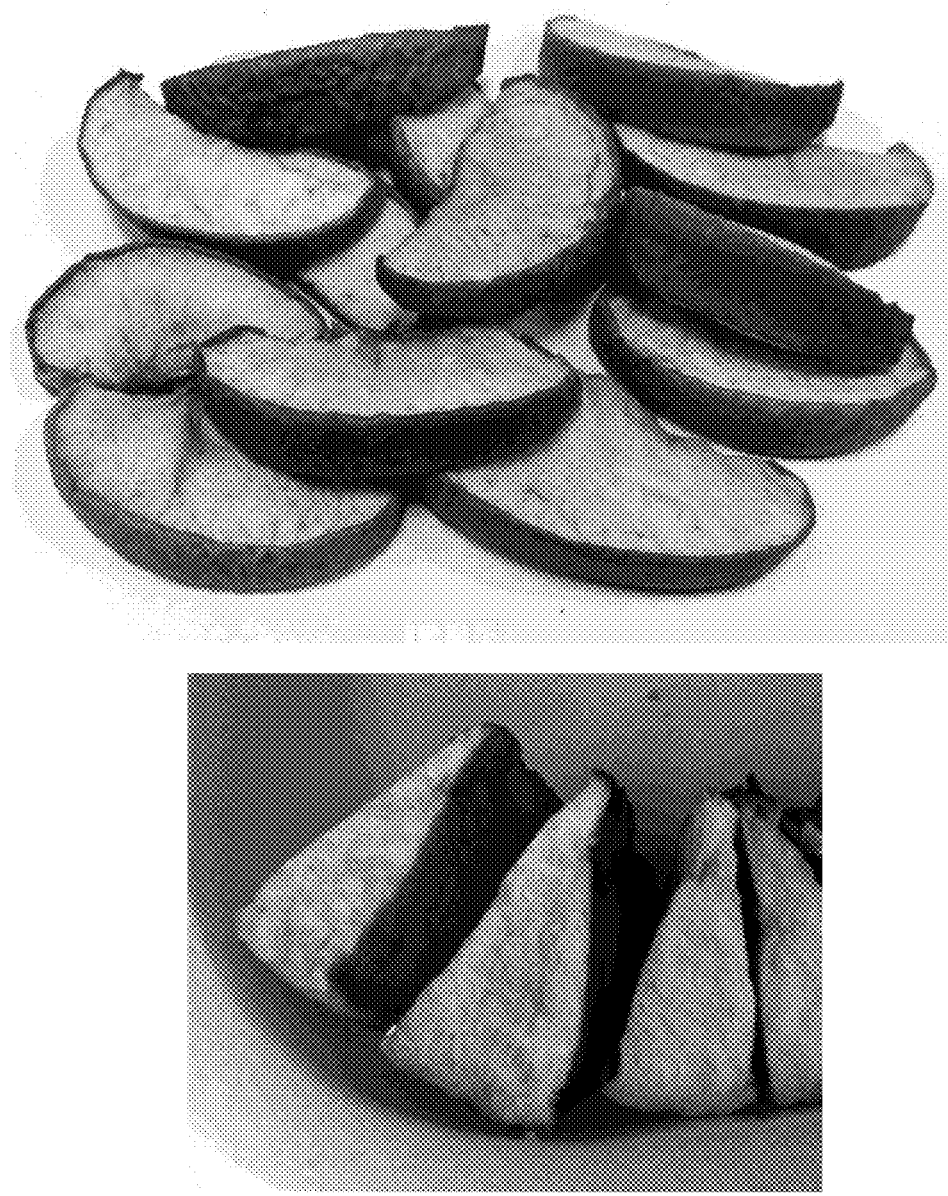
FIG. 2: Photograph of dried and expanded apply wedges following steps a)-d) of the method of the invention in which in step c) a maximum temperature of 90° C. is reached in the product (panel A), 70° C. (panel B) and 65° C. (panel C, not according to the invention). In the top images the appearance of the skin, the tightness thereof, can be seen. The bottom images show transverse cross sections of the wedges, in which one can see the morphology and degree of expansion of the area close to the skin and the straightness of the side edges, from the vertex of the wedge to the skin, indicative of the degree of expansion of the wedge.
Figure 2B:
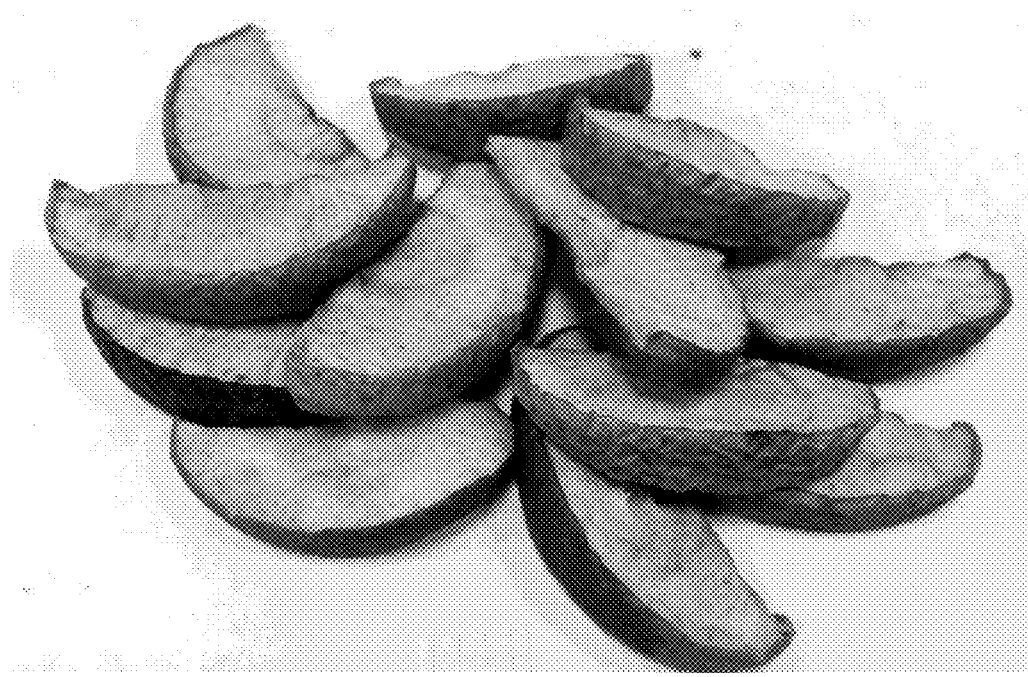
Figure 2B:
Figure 2C:
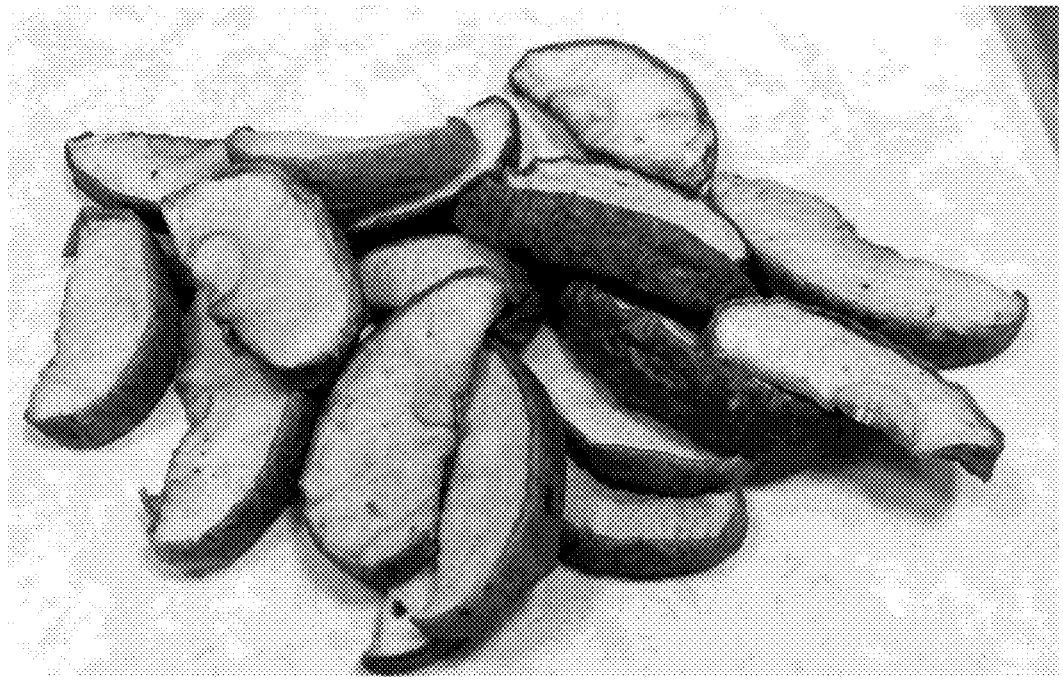
Figure 2C:
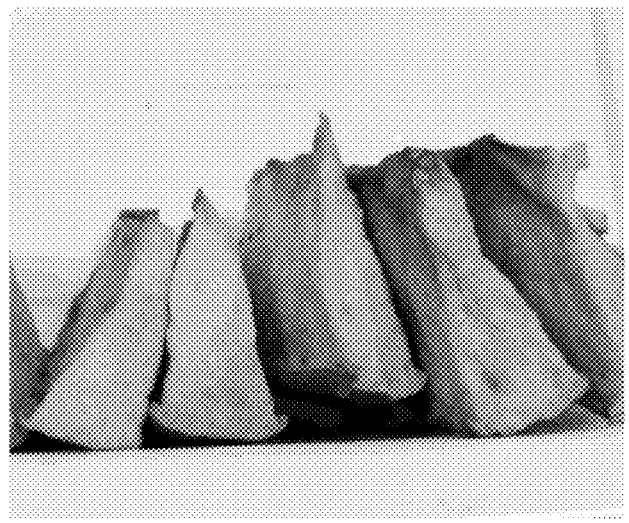

As used in the present application, the singular forms "one/a" and "the" include the corresponding plurals unless otherwise indicated by the context. Unless otherwise defined, all of the technical and scientific terms used in the present document have the meaning that a person skilled in the art to which this invention belongs would normally understand. With the aim of facilitating the understanding and clarifying the meaning of certain terms in the context of the present invention, the following definitions and particular and preferred embodiments of the same are provided, applicable to all of the embodiments of the different aspects of the present invention:

In the context of the present invention, the term vegetable refers to fruits and garden vegetables. Thus, in a particular embodiment the vegetable is a fruit or a garden vegetable, and preferably the vegetable is a fruit. The fruit is the fruit, infructescence or pulpy part of the floral organs that have reached a proper degree of maturity and are suitable for human consumption. In a particular embodiment, the fruit is selected from the group formed by apples, mandarins, pears, bananas, oranges, cherries, pineapples, mangoes, strawberries, apricots, peaches, figs, etc., and preferably the fruit is apple, mandarin, strawberry or pineapple, and more preferably apple. Garden vegetables are edible plants that are grown in a garden. In a particular embodiment the garden vegetable is selected from the group formed by carrots, onions, tomatoes, peppers, potatoes, eggplants, squash, broccoli, cauliflower, asparagus, beets, etc., and preferably the vegetable is pepper or tomato.

In the present invention, moisture is indicated by wet basis, unless otherwise indicated. Moisture on wet basis refers to: grams of water/100 grams of total weight (sum of grams of water and grams of dry solid). Moisture on dry basis refers to: grams of water/100 grams of dry solid.

Partially dehydrated vegetable refers to a vegetable that has been subjected to a drying process and has a moisture content less than 15% (wet basis), preferably having a moisture content in the range of 7% to 14% and more preferably having a moisture content of 8-12%. In the present invention the starting vegetable is partially dehydrated, meaning it is a vegetable that has a moisture content less than 15%, preferably from 7-14% and more preferably from 8-12%.

Dehydrated vegetable refers to a vegetable that has a moisture content lower than 3% (wet basis), preferably a moisture content in the range of 0.8% to 2.5% and more preferably a moisture content of 1.2% to 1.8%. Thus, the final product obtained by the method according to the first aspect of the invention and the vegetable according to the second and third aspect of the invention is a dehydrated vegetable according to the present invention.

In the terms of the present invention, crunchy dehydrated vegetable, or dehydrated vegetable with a crunchiness, is understood as that which has a moisture content as defined in the preceding paragraph, as well as a firm and brittle texture, which breaks and comes apart abruptly and completely during the biting and chewing thereof, producing a characteristic crunch sound when fractured. In the cutting or penetration analysis with the texturometer, the crunchiness is generally associated with a curve having many small fracture peaks as the blade or rod moves through the food. While a fragile product can have the same number of peaks, in a crunchy product the descent from the peak to valley is significantly greater and the linear distance increases as a result. The linear distance (dimensionless) is the total length of an imaginary line that joins all of the points of the curve of the cut or penetration throughout a specific thickness under analysis. Thus, the greater the linear distance, the greater the crunchiness.

The present invention, in a first aspect thereof, relates to a method (method of the invention) for drying vegetables, comprising the following steps:

a) applying microwave energy in conditions of absolute pressure between 123 mbar and atmospheric pressure to a starting vegetable until said vegetable reaches a temperature in a range of 50° C. to 70° C., wherein the starting material has a moisture content of less than 15% (wet basis);

b) applying microwave energy at a microwave power density that is greater or equal to 1 W/g to the vegetable obtained in step a), at an absolute pressure less than or equal to 312 mbar, until the vegetable reaches a temperature in a range of 65° C. to 85° C.;

c) applying microwave energy in conditions of absolute pressure less than or equal to 312 mbar to the vegetable obtained in step b) until the vegetable reaches a temperature in a range of 70° C. to 100° C.; and d) cooling the vegetable obtained in step c) under vacuum, without applying microwaves, at an absolute pressure less than or equal to 123 mbar until reaching a temperature that is less than or equal to 50° C., wherein the temperature reached by the vegetable is greater in step b) than in step a), and is greater in step c) than in step b).

Thus, the method of the present invention comprises four steps that can be summarised as a first microwave preheating step, preferably by vacuum heating (step a, also referred to as preheating step), a second drying and expansion (or puffing) step by microwave vacuum drying (step b, also referred to as the drying and expansion step), a third hardening step, also by microwave vacuum drying (step c, also referred to as the hardening step) and a fourth vacuum cooling and stabilising step, without applying microwaves (step d, also referred to as the cooling and stabilising step). Thus, the entire method of the present invention is a method of drying, expanding and texturising vegetables. The term texturising refers to the fact that the method of the present invention achieves a particular and improved texture in comparison to the starting vegetable, characterised, among other characteristics, by the crunchiness of the final product, which is, as was previously explained, crunchier than the starting vegetable. Furthermore, it is crunchier than other already known dry vegetables obtained by other drying and expansion methods different from the method of the present invention.

In the present method, the starting vegetable to be dried, expanded and texturised is a partially dehydrated vegetable which, as was previously indicated, has a moisture content lower than 15%. With the present method, the moisture of said vegetables is reduced to a moisture lower than 3%, and thus in a particular embodiment the moisture content of the final product is less than 3% and products that can be classified as snacks, in particular according to Royal Decree 126/1989, are thereby obtained. The method of the present invention can therefore be considered a method for preparing snacks. In a particular embodiment of the method of the invention, according to any one of the previous embodiments, the final moisture content of the vegetable is between 0.8% and 2.5%, preferably between 1.2% and 1.8%. Thus, the final moisture content of the product of the present invention is such that in addition to allowing the product to be classified as a snack, it provides stability, both on a microbiological level and a physicochemical level, which results in a product with a long shelf life without the need to be refrigerated, for example at least 6 months under proper packaging conditions.

Unlike other known methods for drying fruits, in the present method a preconditioning step of the starting material (for example infusion, the activation or inactivation of enzymes, deblooming, etc.) is not necessary before subjecting it to the microwaves of step a). The only requirement is that it has a moisture content below 15%, preferably in a range of 7-14% and more preferably in a range of 8-12%. Thus, in a particular embodiment of the method according to the first aspect of the invention, no additional step is carried out before step a), except for the drying to achieve a moisture content below 15%. In another particular embodiment, step a) is carried out directly on a vegetable with a moisture content that is less than 15%, which can be a product acquired on the market. As such, step a), meaning the first application of microwaves, can be done directly on a vegetable with a moisture content lower than 15% which has not been subjected to any other step except for drying the fresh vegetable, for example, it has not been subjected to deblooming or to infusion or treatments with sugar, potassium carbonate and/or me oleate solutions. In a particular embodiment, step a) is carried out directly on a vegetable with a moisture content of less than 15% which has only been subjected to the drying of the fresh vegetable prior to step a), for example, sun drying, forced-air drying, vacuum drying, or overheated steam drying. In this way natural dehydrated vegetable products are obtained. Moreover, if the starting vegetable is a vegetable classified as ecological or organic, the snack obtained by means of the invention can also be classified as ecological or organic.

Likewise, unlike other methods described in the state of the art, in the present method it is not necessary to perform an additional drying step after applying microwaves, for example with forced air or infrared, to further reduce the moisture of the product and to harden the structure and obtain a crunchy texture. Thus, in a particular embodiment of the method according to the first aspect of the invention, according to any of the previous embodiments, no additional drying step is carried out after step c) and/or d). In particular, no additional step is carried out after step c) and/or d), such as forced-air drying and/or radiation drying (for example, with infrared).

Thus, in another particular embodiment, the method of the present invention consists of steps a), b), c) and d), as defined in any one of the embodiments of the first aspect of the invention.

With regard to step a) (preheating step), the combination of the pressure and temperature conditions must be such that evaporation does not occur. As such, in a particular embodiment according to any one of the preceding embodiments, step a) is carried out in such a way that evaporation does not occur. Therefore, in step a), the vegetable quickly goes from room temperature to 50° C.-70° C. because of the microwave energy provided without evaporation of the water (the vegetable is heated by the microwave and does not cool, given that there is no evaporation). In a preferred embodiment of the method of the invention, according to any one of the preceding embodiments, step a) is carried out at an absolute pressure between 312 mbar and 800 mbar, more preferably between 350 mbar and 500 mbar. In another preferred embodiment according to any one of the preceding embodiments, in step a) the vegetable reaches a temperature of 55-65° C. With regard to the microwave energy, in a preferred embodiment according to any one of the preceding embodiments of the method of the first aspect of the invention, step a) is carried out at a microwave power density between 1 W/g and 3 W/g, more preferably between 1.8 W/g and 2.5 W/g.

In a preferred embodiment according to any one of the previously described embodiments, in step a) microwave energy is applied to the starting vegetable at a microwave power density in a range of 1.8 W/g to 2.5 W/g, at an absolute pressure in a range of 350 mbar to 500 mbar, until the vegetable reaches a temperature of 55-65° C., thereby achieving effective heating without evaporation.

Carrying out step a) at fewer millibars than those described in the present invention, although carried out at similar microwave power densities, would result in the evaporation of water practically from the moment the vegetable enters the microwave equipment (and depending on the level of pressure below 123 mbar, evaporation could occur with the product being at room temperature, or even at a lower temperature). Thus, the product would be heated by the microwaves but would be cooling at the same time by evaporation, which would slow down the heating. Furthermore, it would make it so that when carrying out step b), the amount of water contained in the food would be insufficient to produce an expansion effect in the entire mass of the product, which would negatively affect the appearance and texture of the final product.

In step b), the vegetable preheated in step a), with a temperature in a range of 50-70° C., preferably 55-65° C., is subjected to a combination of pressure and power density such that the water is quickly evaporated. This way, quick evaporation of the water is achieved. This quick evaporation, occurring in the temperature range of the vegetable at the end of step a), has a greater expansion effect if it occurred at a lower temperature (for example in the range of 20-40° C.), due to the fact that at these higher temperatures, the thermodynamic properties of the steam/water phase (for example, greater thermal expansion coefficient and thermal diffusivity of the water, less latent heat of the steam, greater internal energy of the water and of the saturated steam) enhance the kinetics of the release of the steam inside the vegetable.

Figure 3:
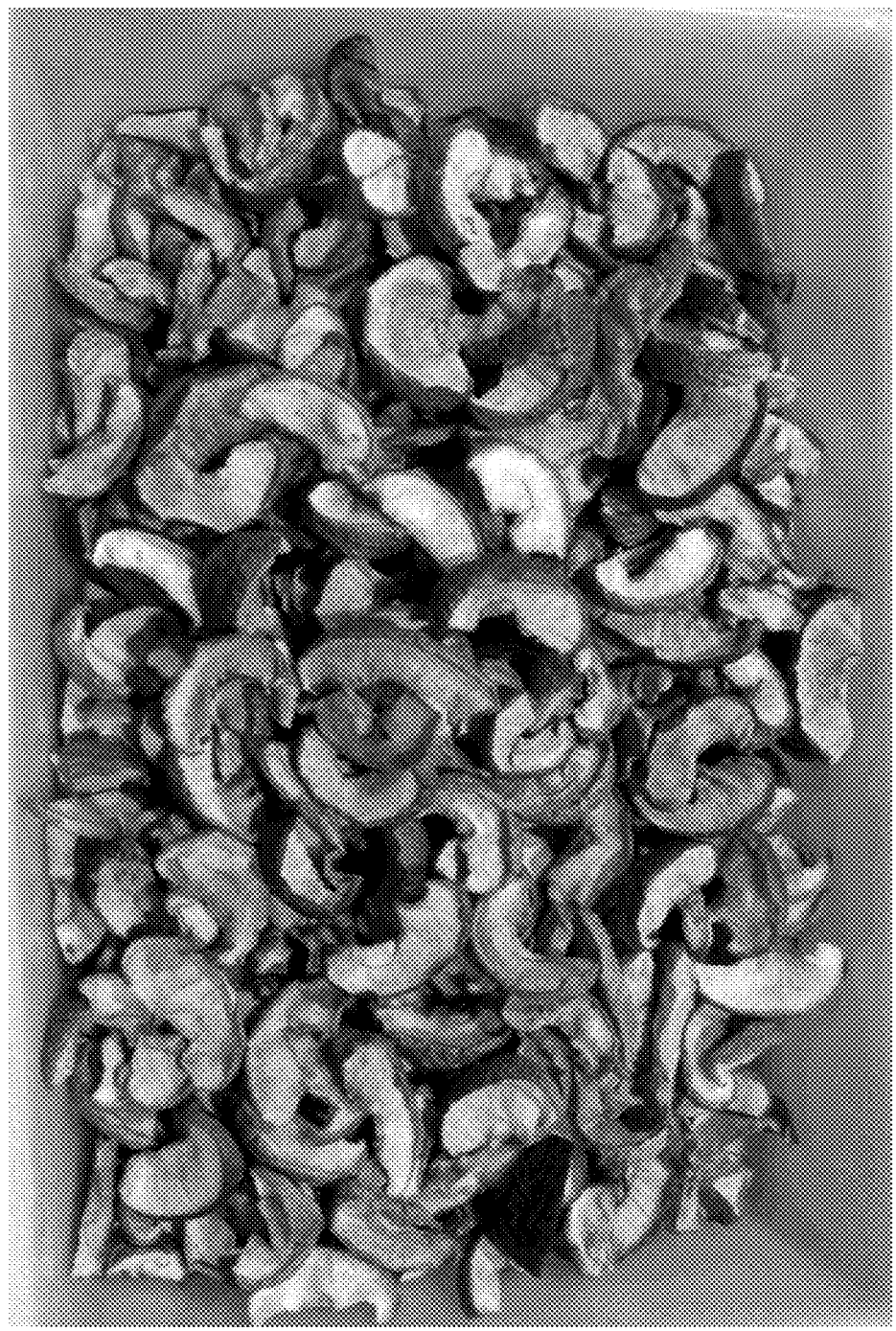
FIG. 3: Photograph of dried apple wedges following a method with steps a), c) and d) of the method of the invention, but wherein step b) was carried out at a microwave power density of 0.4 W/g.

The power density applied in step b) is key to obtaining a correct expansion level. As can be seen in FIG. 3, the product obtained following a method such as that of the invention, but wherein step b) is carried out at 0.4 W/g, does not expand to the level achieved with the conditions of the method of the present invention (compared to the expansion level of FIG. 2, panel A or B).

As such, considering the foregoing points, in a particular embodiment according to any one of the preceding embodiments, step b) is carried out in such a way that evaporation of the water does not occur. In another particular embodiment of the method according to any one of the embodiments of the first aspect of the invention, step b) is carried out at a microwave power density in the range of 1 W/g to 3 W/g, preferably from 1.8 W/g to 2.5 W/g. In another particular embodiment, according to any one of the preceding embodiments, step b) is carried out at an absolute pressure between 10 mbar and 200 mbar, preferably between 10 mbar and 100 mbar. In another preferred embodiment of the method of the invention, according to any one of the preceding embodiments, in step b) the vegetable reaches a temperature between 70° C. and 80° C.

In a preferred embodiment, in terms of the optimal evaporation of water and expansion, in step b) microwave energy is applied at a microwave power density in a range of 1.8 W/g to 2.5 W/g, at an absolute pressure in a range of 10 mbar to 100 mbar, until the vegetable reaches a temperature of 70-80° C.

In step c), certain transitions are produced (for example, caramelisation, hydrolysis) of the main molecules that make up the vegetable material (for example, simple sugars, pectins, fibres, proteins) which contribute to the final crunchiness and to making the structure of the dehydrated-expanded final product more rigid after the cooling thereof, making it more resistant to shrinkage after step d). The particular crunchiness that characterises the vegetable of the present invention especially depends on the maximum temperature the vegetable reaches in step c) of the process, which is the step in which the product reaches the maximum temperature of the entire process. In fact, carrying out step c) at temperatures lower than 70° C., for example at 65° C., does not achieve this surprising crunchiness (see Table 2). As can be seen in said Table 2, the vegetables of the present invention are crunchier than dried vegetables obtained by different expansion processes, available on the market, and are more crunchy the greater the temperature reached. Likewise, they are crunchier than the partially dehydrated starting vegetables (data not shown, compared by a panel of expert tasters).

Thus, considering aforementioned points, in a particular embodiment of the method according to the first aspect of the invention, according to any one of the embodiments described in the preceding paragraphs, step c) is carried out at a microwave power density of 0.55 W/g to 2.3 W/g, preferably from 0.8 W/g to 1.8 W/g. In another particular embodiment, according to any one of the preceding embodiments, step c) is carried out at an absolute pressure between 10 mbar and 200 mbar, preferably between 10 mbar and 100 mbar. In another particular embodiment according to any one of the preceding embodiments, the vegetable reaches a temperature between 80° C. and 95° C.

In a preferred embodiment according to any one of the previously described embodiments, in step c) microwave energy is applied at a microwave power density in a range of 0.8 W/g to 1.8 W/g, at an absolute pressure in a range of 10 mbar to 100 mbar, until the vegetable reaches a temperature of 80-95° C., thereby achieving an improved texture, in particular with regard to the crunchiness of the vegetable.

With regard to step d), in a particular embodiment of the method according to the first aspect of the invention, according to any one of the previous embodiments, step d) is carried out at an absolute pressure in a range of 10 mbar to 70 mbar. In another particular embodiment of the method of the invention, according to any one of the previous embodiments, step d) is carried out until the temperature of the vegetable is less than or equal to 45° C., preferably, for efficiency, until the temperature is in a range of 40° C. to 50° C. As was previously indicated, with step d) the structure of the dehydrated vegetable is hardened and stabilised. Surprisingly, the structure is stable enough to support, without shrinkage, the atmospheric pressure, once the microwave is open, at temperatures as high as 50° C. In other words, the product maintains the expanded structure without the need to cool it to temperatures lower than 50° C., which implies an important energy advantage.

In a preferred embodiment according to any one of the previously described embodiments, in terms of efficiency and stability, in step d) the vegetable obtained in step c) is cooled at an absolute pressure in a range of 10 mbar to 70 mbar to a temperature of 40-50° C.

In a preferred embodiment with regard to the efficiency, expansion, texture and stability of the method of the invention, steps a) and b) are carried out at a microwave power density of 1 W/g to 3 W/g, preferably 1.8 W/g to 2.5 W/g, and step c) is carried out at a microwave power density between 0.55 W/g and 2.3 W/g, preferably 0.8 W/g to 1.8 W/g; step a) is carried out at a pressure between 315 mbar and 800 mbar, preferably 350-500 mbar, and steps b) and c) are carried out at an absolute pressure in a range of 10 mbar to 100 mbar and step d) between 10-70 mbar; and in step a) the vegetable reaches a temperature in a range of 55 to 65° C., in step b) a temperature between 70 and 80° C., in step c) a temperature in a range of 80-95° C. and in step d) it cools to a temperature in a range of 40° C. to 50° C.

As was previously indicated, the temperature the product reaches in steps a), b) and c) gradually increases, meaning it is lower in step a) than in step b) and lower in step b) than in step c). This achieves, in a shorter process time, a greater expansion and a stable expanded structure (which maintains the outer and inner structure (pores) and does not undergo shrinkage), therefore achieving the desired characteristics of the texture of the product and the expanded appearance.

Thus, in conclusion, step a) of the method of the invention efficiently, and avoiding the evaporation of the water of the same, subjects the vegetable to suitable temperature and pressure conditions in order to provide an abrupt evaporation of the water in step b), such that a greater expansive effect is achieved than if the evaporation of the water took place at lower temperatures. Furthermore, during step c) the proper molecular transformations are completed (for example, caramelisations, hydrolysis) which, after the stabilisation and cooling (after step d), obtain the crunchy texture characteristic of the final product. With step d) the new expanded and transformed structure is stabilised, thereby preventing the collapse thereof after re-establishing the atmospheric pressure.

The combination of the conditions of temperature, pressure and microwave power density at which the different steps of the method of the present invention are carried out, as well as the water state of the vegetable in said steps, allows for an expanded dehydrated product to be achieved which practically recovers the volume of the fresh vegetable. Furthermore, the texture of the partially dehydrated starting vegetable is improved, in particular with regard to the crunchiness, and even with respect to other existing drying means. These sensory characteristics, among which the crunchiness and the expanded aspect are included, so interesting and novel in vegetables that have not been fried, make it so that the dehydrated, expanded and texturised vegetables of the present invention have applications that are very different from dried vegetables obtained by other methods, such as, for example, the production of crunchy products in the agro-food industry, such as for pastry-making and confectionaries.

Lastly, as was previously mentioned, the method of the present invention is a method that can be carried out for different types of partially dehydrated vegetables, as long as they have a moisture content lower than 15% (wet basis), and it is carried out in a fast and simple way, without the need for prior operations of infusion or the addition of ingredients to achieve the crunchiness, and without subsequent drying operations by means of other heat sources or equipment, which need an intermediate manipulation, thereby increasing the risk of shrinkage of the structure of the product.

Thus, the present invention provides a quick dehydration method, wherein the vegetables are subjected to temperatures greater than or equal to 70° C. for a short amount of time. By way of example, as shown in Example 1, in the process of the present invention for a batch of 500 grams of partially dehydrated apple, the total amount of time of all of the steps is less than 30 minutes, and the time the product is at the maximum temperature is short, approximately 3 minutes. On an economic level, and with regard to quality of the product, this is an important advantage, given that the product is subjected to high temperatures for a short period of time.

A second aspect of the present invention relates to a vegetable obtained by the method according to any one of the embodiments of the first aspect of the present invention described in the preceding paragraphs. Said vegetable is a dehydrated vegetable, which is characterised in that it has a moisture content lower than 3%. As was indicated in the first aspect of the present invention, the product obtained by the method of the invention is crunchy. Said product is crunchier than the partially dehydrated starting vegetable (data not shown), and is crunchier than the same vegetable dried by other methods (see comparative data on linear distance with regard to CM1 and CM2 in Table 2 of Example 1).

On the other hand, a third aspect of the present invention relates to a vegetable, in particular a dehydrated vegetable, characterised in that it has a moisture content lower than 3% (wet basis) and is crunchy.

The dehydrated vegetable according to the second and third aspect of the invention is also characterised in that it has an expanded structure. Said expanded structure is highly alveolated in the interior and on the exterior it provides the vegetable with a voluminous appearance, which is similar to the volume of the fresh vegetable. Due to the volume acquired, to the inner porosity and the low level of moisture, the dehydrated vegetable has an apparent density and water activity that are significantly lower than those of the partially dehydrated starting vegetable (see Example 1). Furthermore, said expanded structure has a rigidity which, combined with the inner porosity, provides the dehydrated vegetable with the extraordinary crunchiness thereof. This last characteristic makes the product of the invention, according to the second and third aspect, an attractive snack for children, given that it has a similar appearance to potato chips, but are healthier due to the low fat content thereof, only having the fat content of the raw material, due to the fact that it does not require frying.

Furthermore, with regard to the texture inside one's mouth, it is important to point out that when chewing the vegetables according to the present invention, the skin is not distinguished from the flesh, the entire product having the same texture. This is important because there are processes that result in a skin with an unpleasant plastic-like texture for the consumer and which, therefore, need to be peeled prior to being dried, which makes the process difficult and leads to the loss of nutrients present in the skin. In the present invention the skin does not have a different texture than the flesh of the vegetable and is pleasant to the palate, and therefore it is not necessary to peel the vegetable before drying it.

In a preferred embodiment according to any one of the previous embodiments of the vegetable according to the second and third aspect of the invention, the vegetable has a moisture content of 0.8%-2.5%, more preferably of 1.2%-1.8%. Thus, the authors of the invention have developed vegetable products that comply with regulation Royal Decree 126/1989 and can therefore be classified as snack products.

Lastly, a fourth aspect of the invention relates to a food product that comprises a vegetable according to any one of the embodiments of the second or third aspect of the present invention. Likewise, the invention relates to the use of a vegetable according to a second or third aspect of the invention for direct consumption thereof, for example as a snack, or as an ingredient in the agro-food industry. Thus, for example, it can be used as an ingredient for producing a food product, food supplements, dietary supplements, etc.

EXAMPLES

Below are some specific exemplary embodiments of the invention that will serve to illustrate the invention without limiting the scope of the same.

Example 1: Preparation of Apple Snacks

We start with apple wedges with pre-dried skins, with a thickness of 10 mm and a moisture content of 11% (wet basis). A sample of apple wedges (500 grams) was placed in an oscillating plastic drum, transparent to microwaves, perforated to facilitate the exit of steam and the cooling of the product. The drum was placed inside the microwave reactor and the absolute pressure was lowered to 400 mbar. A microwave power density of 2 W/g was applied until reaching the temperature of 65° C. of the product (step a), which happened in 3 minutes. In these processing conditions, the apple wedges were heated to a temperature below the evaporation temperature in equilibrium with the applied pressure, thereby achieving that the structure of the product was susceptible to expansion in the next phase of the process. Once the temperature reached 65° C., the absolute pressure was lowered to 20 mbar and the power density was maintained at 2 W/g until reaching 80° C. (step b), which happened in 3 minutes. In the third phase of the process, the microwave power density was lowered to 1.4 W/g and was maintained until the product reached 90° C. (step c), which happened in 3 minutes. Lastly, the stabilisation phase of the product was carried out, wherein the same was cooled from 90° C. to 45° C. in vacuum conditions (absolute pressure of 20 mbar) without applying microwave energy (step d). This step lasted 18 minutes. The summary of the conditions of the process carried out is detailed in Table 1 (Method A). The same process was carried out with variants in some conditions, as shown in Table 1 (methods B-C). The final products of methods A, B and C are named Product A, B and C, respectively.

TABLE 1

Summary of the conditions of the process: power density, absolute pressure and maximum temperature of the product in steps a), b) and c) and absolute pressure and final temperature of the product in step d).

| Steps | Method A | Method B | Method C |
|---|---|---|---|
| a) preheating | 2 W/g, 400 mbar, 65° C. | 2 W/g, 400 mbar, 60° C. | 2 W/g, 400 mbar, 55° C. |
| b) drying and expansion | 2 W/g, 20 mbar, 80° C. | 2 W/g, 20 mbar, 65° C. | 2 W/g, 20 mbar, 60° C. |
| c) hardening/texturising | 1.4 W/g, 20 mbar, 90° C. | 1.4 W/g, 20 mbar, 70° C. | 1.4 W/g, 20 mbar, 65° C. |
| d) cooling | 45° C. 20 mbar | 42° C. 20 mbar | 40° C. 20 mbar |

The moisture, apparent density, water activity and texture of the final product are characterised as indicated below.

The moisture content of the apple wedges was determined by gravimetry at 70° C. in a vacuum, a method based on the AOAC Official Method 934.06—Moisture in Dried Fruits. The moisture is presented in water basis (g of water/100 g of total weight). The density was measured in a voluminometer IVOL-2 (SBS Labscience) and presented in dry basis (kg of dry extract/litre). The water activity was measured in AquaLab (series 3, Decagon Devices, Inc., Pullman, Wash., USA) at room temperature.

For determining the mechanical properties of the structure of the apple snack, a TA HD-Plus texturometer (Stable Micro Systems) was used, with a cylindrical probe having a diameter of 4 mm. The analysis of the crunchiness of the snack was done by Exponent 6.1.9.0 software (Stable Microsystems) by determining the linear distance of the multi-peak curves, which is a dimensionless parameter. The products that have greater linear distances have greater crunchiness. This technique cannot be applied to the starting vegetable due to the chewy nature thereof.

Two commercial products are also characterised, referred to as CM1 and CM2. According to the information of the manufacturer, the product CM1 is produced by applying microwaves in a vacuum and at temperatures below 40° C. and product CM2 is produced with expansion technology that applies pressurised steam, without the use of microwaves. Both processes of the aforementioned commercial products have a conventional final drying stage by forced air.

The moisture of the partially dehydrated apple wedges, used as starting materials for products A and B, object of the present invention, was 11.12±0.07% (wet basis), the apparent density was 0.673±0.068 kg of dry extract/litre and the water activity was 0.433±0.011. The apparent density of products A and B was 0.332±0.045 and 0.354±0.019, respectively. The water activity of products A and B was 0.318±0.011 and 0.334±0.016, respectively. Thus, one can see that the vegetable dehydrated by the present invention has an apparent density and a water activity that are significantly lower than those of the partially dehydrated vegetable from which it comes, due to the acquired volume, the inner porosity thereof and the low level of moisture with respect to the partially dehydrated starting vegetable.

As can be seen in Table 2, there are significant differences with regard to the crunchiness between the commercial products and the products produced by the method according to the present invention (methods A and B), the crunchiness being greater when the highest maximum temperature of the process is reached, 90° C. (method A). One can also see significant differences between the products obtained by the method according to the present invention wherein the product has reached a maximum temperature of 90 or 70° C. (methods A and B, respectively) and the product produced with the same method but without reaching a temperature greater than 65° C. (method C), the crunchiness of the latter being similar to commercial products. Thus, with the method of the present invention, textures are achieved that are significantly crunchier than those achieved by other expansion methods.

There are also significant differences at 95% between said products with regard to the final moisture content of the product. The dehydrated apples according to the present

TABLE 2

Characteristics of the final product of methods A-C of the commercial products.

| | Product A | Product B | Product C | Prod. CM1 | Prod. CM2 |
|---|---|---|---|---|---|
| Linear distance | 40211.327 (10532.714) | 19075.777 (8434.847) | 4754.555 (764.656) | 5993.609 (1355.864) | 4420.137 (690.129) |
| Moisture | 1.30 (0.04) | 2.31 (0.18) | 2.52 (0.23) | 3.45 (0.25) | 3.20 (0.05) |

The results of moisture content and apparent density are the average of 2 samples of 10 g (between 4-6 wedges/sample) for each processing condition, and those of the linear distance and water activity, an average of 10 and 5 wedges, respectively. Table 2 shows, in parenthesis, the confidence interval at 95% of significance.

invention have a final moisture content below 2.5% while the commercial products have a moisture content greater than 3%.

It is important to mention that the crunchiness of the commercial products is not differentiated from the product produced with the method without reaching a temperature greater than 65° C. (method C), even when the latter has a moisture that is significantly less than the commercial products and equivalent to methods A and B. Therefore, in these moisture ranges, the difference in the crunchiness between the products of the present invention (methods A and B) and the commercial products could be attributed to the maximum temperature reached by the vegetable in the process (compared to CM1) or to said temperature and the relative moisture conditions of the environment in which said temperature is reached (compared to CM2).

As can be seen in FIG. 2, there are also differences in the outer appearance, since the products obtained by the method of the present invention are apple snacks with a tight skin (panel A) or slightly wrinkled (panel B) and with a "filling" level or swelling of the flesh in the area close to the skin that makes it so the transverse cross section of the wedges is triangular or practically triangular. However, when carrying out the same method but without exceeding the maximum temperature of 65° C. in the product (panel C), the skin is visibly more wrinkled (which can be perceived in the mouth as a more leathery sensation) and the transverse cross section of the wedges makes a small curve between the flesh and the skin, indicative of a lower degree of expansion during the process and/or less stability which leads to shrinkage of the structure. This makes it so the snacks according to the invention are more appealing and desirable to the consumer.

With regard to the texture inside one's mouth, it is important to point out that when chewing the products according to the present invention, the skin is not distinguished from the flesh, the entire product having the same texture. This is important because there are processes that result in a skin with an unpleasant plastic-like texture for the consumer and which, therefore, need to be peeled prior to being dried, which makes the process difficult and leads to the loss of nutrients present in the skin.

Figure 4:
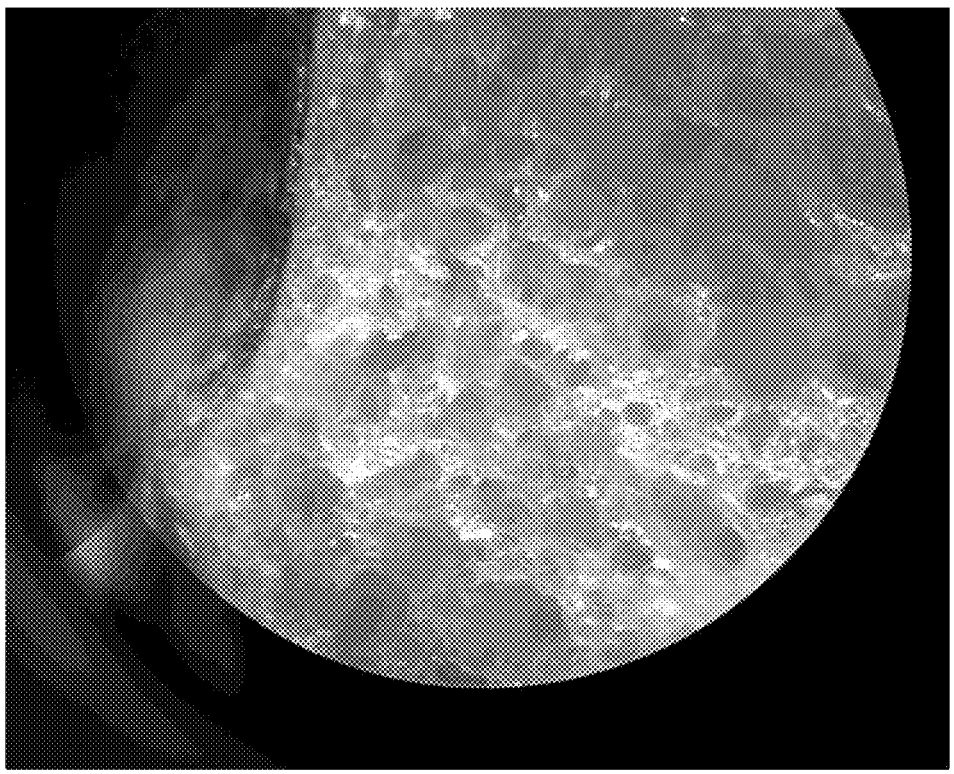
FIG. 4: Photograph magnified 60 times of a transverse cross section of a dried apple wedge following the method of the invention (panel A) and of two commercial products CM1 (panel B) and CM2 (panel C). In the three images a porous structure can be seen, but in panel A the form of the pores is spherical, while in panels B and C the pores are more irregular and crushed, which affects the final texture of the product.
Figure 4:
Figure 4:
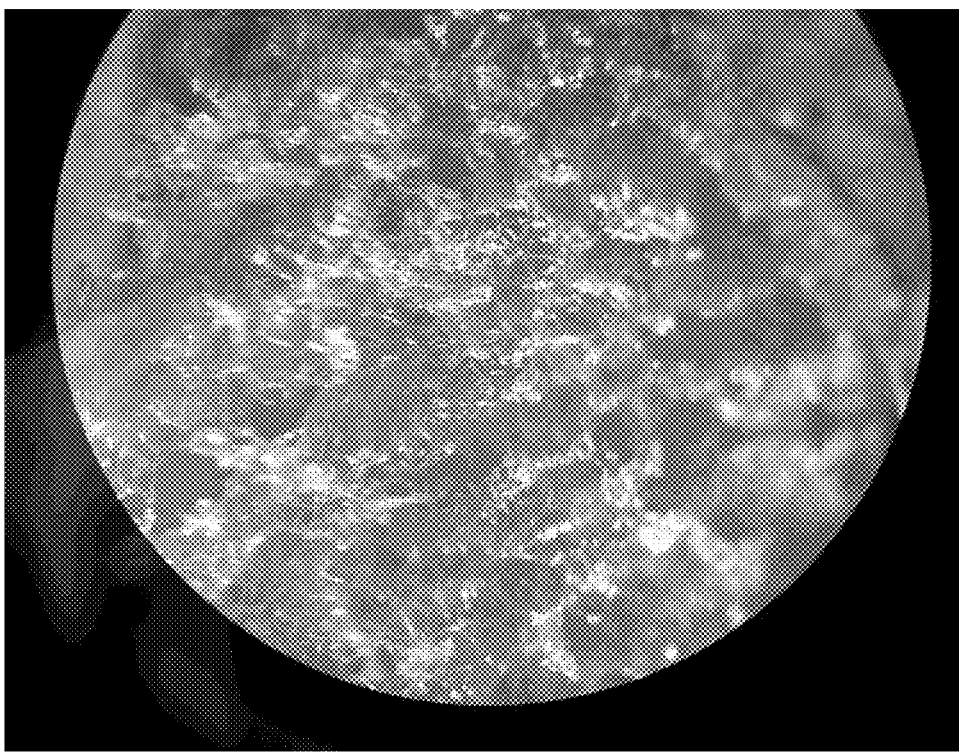

Another difference between the texture of the products of the present invention and the commercial products or those obtained by methods in which the temperature does not exceed 65° C. is the resulting morphology of the pores of the internal structure of the product. As can be seen in FIG. 4 in the products according to the present invention (panel A), the pores have a rounded shape and are more uniform in size and in the distribution thereof throughout the entire mass of the product, while commercial products CM1 (panel B) and CM2 (panel C) have more irregular and flattened shapes. The size, shape and distribution of the pores obtained in the product according to the invention contribute to the distinguished crunchiness of the dehydrated vegetable.

The invention claimed is:

1. A method for drying a vegetable comprising:
a) applying microwave energy in conditions of absolute pressure between 312 mbar and 800 mbar to a starting vegetable until said vegetable reaches a temperature in a range of 50° C. to 70° C., wherein the starting vegetable has a moisture content that is less than 15%;
b) applying microwave energy at a microwave power density that is greater or equal to 1 W/g to the vegetable obtained in step a), at an absolute pressure less than 312 mbar, until the vegetable reaches a temperature in a range of 65° C. to 85° C.;
c) applying microwave energy in conditions of absolute pressure less than 312 mbar to the vegetable obtained in step b) until the vegetable reaches a temperature in a range of 70° C. to 100° C.; and
d) cooling the vegetable obtained in step c) under vacuum, without applying microwaves, at an absolute pressure less than or equal to 123 mbar until reaching a temperature that is less than or equal to 50° C.,
wherein the temperature reached by the vegetable is greater in step b) than in step a), and is greater in step c) than in step b); and
wherein the vegetable obtained is crunchy.

2. The method according to claim 1, wherein the starting vegetable has a moisture content in the range of 7 to 14%.

3. The method according to claim 1, wherein step a) and/or step b) is carried out at a microwave power density between 1 W/g and 3 W/g.

4. The method according to claim 3, wherein step c) is carried out at a microwave power density between 0.55 W/g and 2.3 W/g.

5. The method according to claim 1, wherein step a) is carried out at an absolute pressure between 350 mbar and 500 mbar.

6. The method according to claim 5, wherein step b) and/or step c) is carried out at an absolute pressure between 10 mbar and 200 mbar.

7. The method according to claim 6, wherein step d) is carried out at an absolute pressure between 10 mbar and 70 mbar.

8. The method according to claim 1, wherein step a) is carried out until the temperature of the vegetable is in the range of 55-65° C.

9. The method according to claim 1, where in step b) is carried out until the temperature of the vegetable is in the range of 70-80° C.

10. The method according to claim 1, wherein step c) is carried out until the temperature of the vegetable is in the range of 80-95° C.

11. The method according to claim 1, wherein in step d) the vegetable is cooled until reaching a temperature in the range of 40° C. to 50° C.

12. The method according to claim 1, wherein the vegetable of step a) has not been subjected to a deblooming or infusing step.

13. The method according to claim 1, which does not comprise any additional drying step after step c) and/or step d).

14. The method according to claim 1, wherein the vegetable obtained has a moisture content that is less than 3%.

15. The method according to claim 1, wherein the vegetable is a fruit.

16. The method according to claim 15, wherein the fruit is an apple.

17. The method according to claim 16, wherein the apple is an apple wedge.

18. The method according to claim 17, wherein the apple wedge has a thickness of about 10 mm.

19. The method according to claim 1, wherein step b) and/or step c) is carried out at an absolute pressure between 10 mbar and 100 mbar.

20. A method for drying a vegetable comprising:
a) preheating a starting vegetable under conditions of about 2 W/g microwave energy and about 400 mbar absolute pressure until the preheated vegetable reaches an initial temperature of 60° C. to 65° C., wherein the starting vegetable has a moisture content that is less than 15%;
b) drying the preheated vegetable under conditions of about 2 W/g microwave energy and about 20 mbar absolute pressure until the dried vegetable reaches a second temperature that is 65° C. to 80° C., wherein the dried vegetable is expanded;

c) hardening the dried vegetable under conditions of about 1.4 W/g microwave energy and about 20 mbar absolute pressure until the hardened vegetable reaches a third temperature that is 70° C. to 90° C., wherein the hardened vegetable is texturized; and
d) cooling the hardened vegetable, without applying microwave energy, at about 20 mbar absolute pressure until the temperature of the cooled vegetable lowers to 40° C. to 45° C.;

wherein a crunchy vegetable having an expanded porous structure is thereby formed, and the expanded porous structure of the crunchy vegetable provides crunchiness.

* * * * *